March 15, 1938.    J. AMOURELLE    2,111,200
MECHANICAL PACKING JOINT
Filed July 26, 1935    2 Sheets-Sheet 1

Inventor
Jean Amourelle
per Fred F. Barlow
Attorney

March 15, 1938.   J. AMOURELLE   2,111,200
MECHANICAL PACKING JOINT
Filed July 26, 1935   2 Sheets-Sheet 2

Inventor
Jean Amourelle
per Fred F Barlow
Attorney

Patented Mar. 15, 1938

2,111,200

UNITED STATES PATENT OFFICE 2,111,200

MECHANICAL PACKING JOINT

Jean Amourelle, Les Gatines par Plaisir, France

Application July 26, 1935, Serial No. 33,313

5 Claims. (Cl. 285—92)

The present invention relates to improved packing devices for rods, shafts, tubes and the like and it is applicable both to rods and the like having a rotary movement as well as to those with an oscillatory rectilinear movement.

According to the present invention, a packing device includes a convex element with a spherical convex working surface and a concave element having a substantially spherical concave working surface and the latter element is formed with an outer portion and a central portion of the latter being formed from a metal having a different resistance to wear from the outer portion, the two concave portions being struck from slightly different centres to form double spaced contact with the convex spherical member, which latter is plane on the side not in engagement with the concave element, a casing containing a deformable packing material being forced against said plane face by means of a spring.

Further features of the invention will be apparent from a consideration of the accompanying drawings which will serve to enable the invention to be understood more fully.

Figure 1:
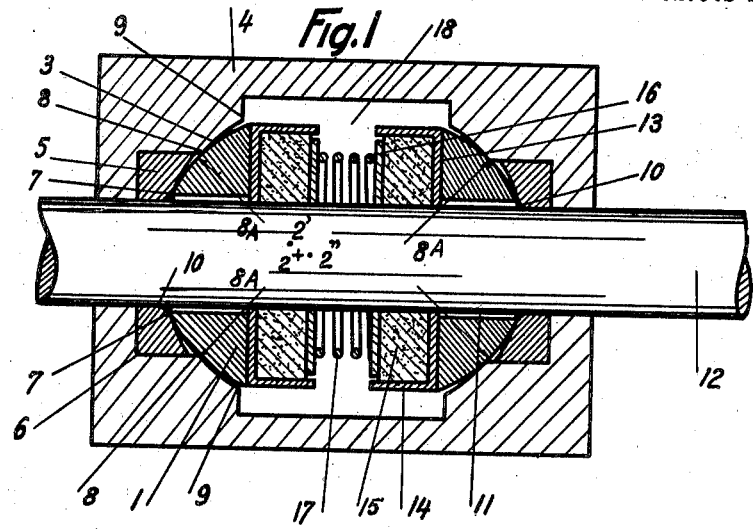
Fig. 1 shows a packing device in accordance with the invention in its simplest form as applied to the packing for a rod, shaft or the like having a rotary or reciprocatory motion.

Referring first to Fig. 1, which is intended more particularly to show the theoretical constuction of a packing device for a shaft 12 adapted to have either a reciprocatory or rotary motion, a pair of convex members 1 is provided around the shaft 12 with a sufficient clearance to permit the shaft to move freely therein. The said convex members 1 bear against concave recesses in an enclosing box 4, said recesses being provided towards the centre with inserts or packings 5 formed of a metal having a different resistance to wear from that of the box 4, the outer portion of the concavity having a slightly different centre of curvature from the inner inset portion. In the course of wear due to rotary or reciprocatory motion of the shaft 12 and consequential slight movements of the spherical members 1 in the concave recesses in the box 4, the said insert 5 is worn down at a different rate from the part of the concave recess against which the convex member 1 bears so that an edge 8A is produced at the line of demarcation between the insert 5 and the concave recess in the box 4, which edge becomes highly polished and thus a fluid-tight joint is formed at this point against the convex spherical members 1, the portion of the convex surface coming adjacent the shaft contacting with the insert 5 and thus double spaced contact is made by the convex spherical members. The latter are provided towards the rear with a plane face against which there bear cup members 14 which contain packing material 15, discs 16 being provided adapted to bear on said packing material while a spring 17 is provided between the said discs 16. By the action of the said spring, the packing material 15 in the cups 14 is compressed and forced towards the shaft 12, ensuring a packing at this point, while the pressure of the said spring is also applied through the cups 14 to the convex members 1 which are thereby forced into contact with the concave housings therefor.

Any loss of oil there may be past the edge 8A or past the packing 15 around the shaft will tend to be localized in the chamber 18 and will build up a pressure in this position which will further tend to force the cups 14 against the convex members 1.

Figure 2:
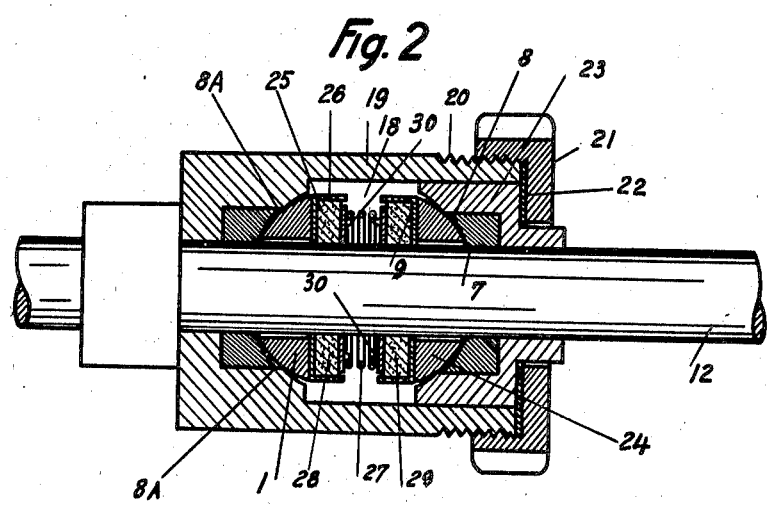
Fig. 2 illustrates a practical form of packing joint in accordance with the invention.

Fig. 2 illustrates a practical embodiment of the packing device shown in Fig. 1 as applied to a stuffing box of common form. In this case the spherical convex members 1 are located in a box 19 having a threaded portion 20 at its forward end adapted to receive a clamping nut 21 serving to retain a removable element 23, a packing 22 being interposed between the nut 21 and the element 23. The concave recesses to co-operate with the spherical members 1 are formed respectively in the box 19 and in the element 23 and each of these parts is provided with an insert similar to 5 of Fig. 1. Cups 26 are provided, bearing against the plane faces of the spherical convex members 1, said cups containing a resilient packing material 25 and being engaged by discs 28, 29 provided with projections 30 to locate a spring 27 disposed between said discs 28, 29.

By screwing the nut 21 home, the slidable element 23 is moved axially into the packing joint and thereby the spring 27 is compressed to exert axial pressure on the packing material 25 in the cups 26 and on the spherical convex members 1 to press the latter against the concave recesses in the box 19 and in the element 23.

Figure 3:
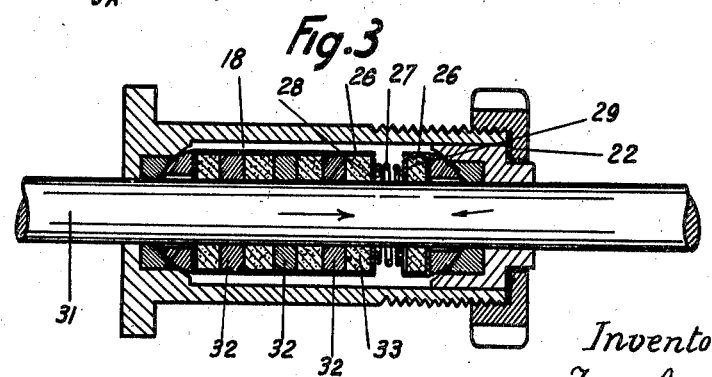
Fig. 3 shows a modification for a long rod or shaft having a reciprocatory motion.

The arrangement shown in Fig. 2 is particularly applicable to a rotary shaft whereas Fig. 3 illustrates a suitable embodiment as applied to a rod 31 adapted to have reciprocatory movements. A substantially similar arrangement is adopted as in the foregoing figures but in this case the cup 26 is adapted to receive a plurality of packing elements 32, 33, the former conveniently comprising rigid rings and the latter rings of resilient packing material. In this case again, a spring 27 is located between discs 28, 29 whereby axial pressure may be exerted on the packing and on the coengaging spherical convex and concave members.

Figure 4:
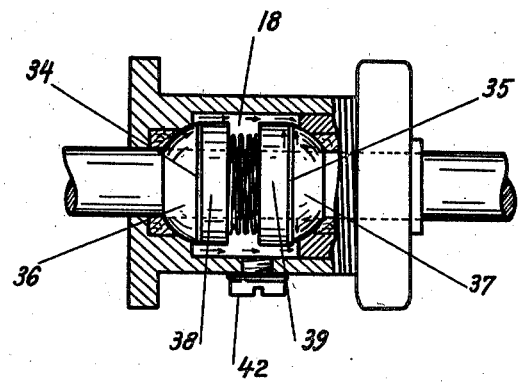
Fig. 4 shows a modified form of the invention.

In the embodiment of Fig. 4, which is generally similar to that shown in Fig. 2, there are interposed between the cup 26 and the rear plane face of the convex members 1, rings 34 and 35 which, by the action of the rotation or reciprocation of the shaft, become highly polished.

Figure 5:
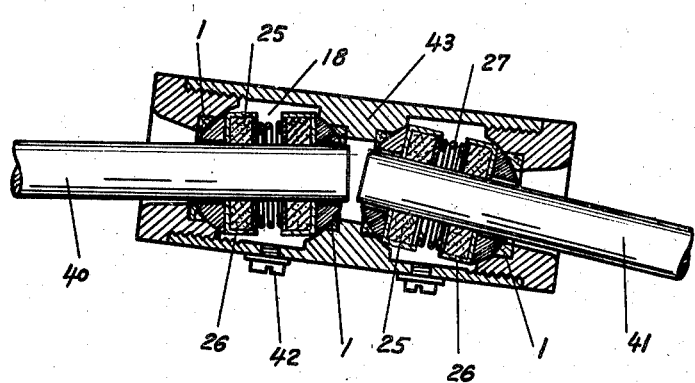
Fig. 5 shows the application of the packing devices according to the invention to a tube joint.

In the pipe joint illustrated in Fig. 5, a pair of packing devices, in general similar to that shown in Fig. 1 or 2, is located in a single box 43. The tubes to be connected, 40, 41, each extend through one of the said packing devices, the two ends of the said pipes being adjacent each other in a small chamber 44. Each packing device comprises a pair of convex spherical members 1 which engage with concave recesses in the box 43, said recesses being provided with softer inserts similar to 5 of Fig. 1. Against the rear plane face of each spherical convex member 1 there bears a box 26 containing a resilient packing material 25, the said packing material being engaged by discs 16 and a spring 17 being arranged between the said discs. Thereby the exit of fluid from the chamber 44 is prevented and a fluid-tight joint is produced which is capable of permitting the tubes 40, 41 to move freely in all directions within given limits.

The invention is not limited to the precise forms or details of construction described, as these may be varied to suit particular cases.

I claim:

1. A packing device comprising a casing having a substantially spherically concave recess formed therein, a central insert in said concave recess formed of a different metal from said casing and having a different resistance to wear therefrom, the said central insert having its curvature struck from a slightly different centre from that of the portion surrounding it to leave a slight edge at the junction between the portions, an element spherically convex on one face and making double spaced contact with the portions of said concave recess, said element being plane on its other face, a circular box-like housing engaged against the said plane face, deformable packing material in said housing, and spring means tending to compress said packing material and to press said housing against the said element to engage the convex part thereof in the concave recess.

2. A packing device comprising a casing having substantially spherically concave recesses at each end, a central insert in each of said concave recesses formed of a different metal from said casing and having a different resistance to wear therefrom, each said central insert having its curvature struck from a slightly different centre from that of the portion surrounding it to leave a slight edge at the junction between the portions, elements spherically convex on one face and plane on the other face making double spaced contact with the portions of said concave recesses, cup-like housings bearing against the plane face of each of said elements, deformable packing material in said housings, and single spring means between each of said housings tending to compress the said packing material and to force said housings against the said elements, whereby the convex faces thereof are forcibly engaged in the concave recesses.

3. A packing device comprising a casing having a substantially spherically concave recess formed therein, a central insert in said concave recess formed of a different metal from said casing and having a different resistance to wear therefrom, the said central insert having its curvature struck from a slightly different centre from that of the portion surrounding it to leave a slight edge at the junction between the portions, an element spherically convex on one face and making double spaced contact with the portions of said concave recess, said element being plane on its other face, a cup-like housing, deformable packing material in said housing, a disc interposed between one face of said housing and the plane face of the said element, and spring means tending to press said housing and said disc against said element.

4. A universal tube joint for connecting two lengths of tube comprising a casing having four spherically concave recess portions, a central insert in each of said concave recesses formed of a different metal from said casing and having a different resistance to wear therefrom, each said central insert having its curvature struck from a slightly different centre from that of the portion surrounding it to leave a slight edge at the junction between the portions, four elements spherically convex on one face and plane on the other and surrounding the tubes to be connected in engagement with said concave portions, two of said elements being associated with each length of tube to be connected, cup-like housings bearing against said elements, deformable packing material in said housings, and spring means disposed between each pair of housings so as to exert an outward pressure on the pairs of elements mounted on the tubes to be connected to force the pairs of elements against both portions of the concave portions in the casing.

5. A packing device as claimed in claim 2 in which one of the cup-like housings contains a plurality of successively disposed rigid and deformable rings, for the purposes set forth.

JEAN AMOURELLE.